(12) United States Patent
Sutanto et al.

(10) Patent No.: US 7,266,648 B2
(45) Date of Patent: Sep. 4, 2007

(54) CACHE LOCK MECHANISM WITH SPECULATIVE ALLOCATION

(75) Inventors: Edwin R. Sutanto, Austin, TX (US); Hoichi Cheong, Austin, TX (US); Zhongru J. Lin, Lake Oswego, OR (US); Jeffrey L. Nye, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/215,684

(22) Filed: Aug. 29, 2005

(65) Prior Publication Data

US 2006/0064551 A1   Mar. 23, 2006

Related U.S. Application Data

(62) Division of application No. 10/319,013, filed on Dec. 13, 2002, now Pat. No. 6,986,010.

(51) Int. Cl.
*G06F 12/00* (2006.01)
*G06F 13/00* (2006.01)

(52) U.S. Cl. .................... 711/145; 711/133; 711/154

(58) Field of Classification Search ............ 711/100, 711/117, 118, 133, 145, 154, 158, 163, 167, 711/170
See application file for complete search history.

(56) References Cited

U.S. PATENT DOCUMENTS

| | | | | |
|---|---|---|---|---|
| 5,276,848 A | * | 1/1994 | Gallagher et al. | 711/121 |
| 5,551,046 A | * | 8/1996 | Mohan et al. | 707/8 |
| 5,796,977 A | * | 8/1998 | Sarangdhar et al. | 718/1 |
| 5,844,569 A | * | 12/1998 | Eisler et al. | 345/619 |
| 6,105,119 A | * | 8/2000 | Kerr et al. | 711/219 |
| 6,289,343 B1 | * | 9/2001 | Freund et al. | 707/8 |

* cited by examiner

*Primary Examiner*—Tuan V. Thai
(74) *Attorney, Agent, or Firm*—Trop, Pruner & Hu, P.C.

(57) ABSTRACT

A method and apparatus to speculatively allocate a combinable store request buffer for a cache lock operation by setting an extended lock indicator. The store request buffer is speculatively allocated and the load-lock micro-operation associated with the cache lock operation is sent to a replay loop. During the replay window, conflict detection processing is completed. When the load-lock micro-operation returns from replay, the store buffer is de-allocated if a conflict has been detected during the replay window.

7 Claims, 7 Drawing Sheets

CACHE LOCK MECHANISM WITH SPECULATIVE ALLOCATION

RELATED APPLICATION

This application is a divisional application of patent application Ser. No. 10/319,013, filed on Dec. 13, 2002 now U.S. Pat. No. 6,986,010.

BACKGROUND

1. Technical Field

The present invention relates to systems for processing data and, more particularly, to systems employing a cache lock/unlock protocol for non-blocking caches.

2. Background Art

Microelectronic manufacturers are continually striving to improve the speed and performance of microprocessors and other processing devices, the performance of such devices being dependent upon many factors. One factor affecting the performance of a processor is the scheduling and execution of instructions associated with a piece of code executing on the processor. Many processors include an instruction decoder that decodes an instruction to create one or more micro-instructions, or micro-operations, that can be understood and executed by the processor. Micro-instructions and micro-operations will be referred to herein, in the singular, as a "µOP." Micro-operations ready for execution are provided to a scheduler, which schedules the order of execution for a series of µOPs. Scheduled µOPs are then inserted into an execution stream and subsequently passed to execution circuitry for execution. A processor may also include a checker that determines whether a µOP has been properly executed. If a µOP has been properly executed, the µOP is retired. If the µOP did not properly execute, the µOP is sent into a replay loop, wherein the µOP is returned to the scheduler and rescheduled for execution.

Another factor affecting performance of microprocessors is the efficiency of the cache memory subsystem. One commonly-used method of increasing performance of cache memory subsystems is the implementation of a "non-blocking" or "out of order completion" cache mechanism, in which older requests for memory access, if they cannot be immediately serviced to completion, are "passed" by new requests that can complete sooner. The non-blocking cache mechanism determines which memory access requests can complete and which must wait. The non-blocking cache mechanism also provides a mechanism for permitting memory access requests to pass each other, and tracks the memory access requests as they complete out of order. A typical implementation of a non-blocking cache mechanism may use load request buffers ("LDRB's") and store request buffers ("STRB's") to track uncompleted memory requests.

Certain types of memory access requests do not support a non-blocking scheme. These types of requests require that there be no other reads or writes to the specified memory address until the requesting memory access instruction has completed execution. Such requests are "serialization events" because they require the processor to inhibit the non-blocking cache mechanism, and instead "lock" the cache, during execution of these instructions. In other words, strict ordering of the completion of requests is enforced for serialization events.

Embodiments of the cache lock apparatus and method disclosed herein address efficiency concerns and other issues related to serialization events in a non-blocking cache environment.

BRIEF DESCRIPTION OF THE DRAWINGS

The present invention may be understood with reference to the following drawings in which like elements are indicated by like numbers. These drawings are provided to illustrate selected embodiments of a reduced-hardware soft error detection apparatus and method and are not intended to be limiting.

DETAILED DISCUSSION

Figure 1:
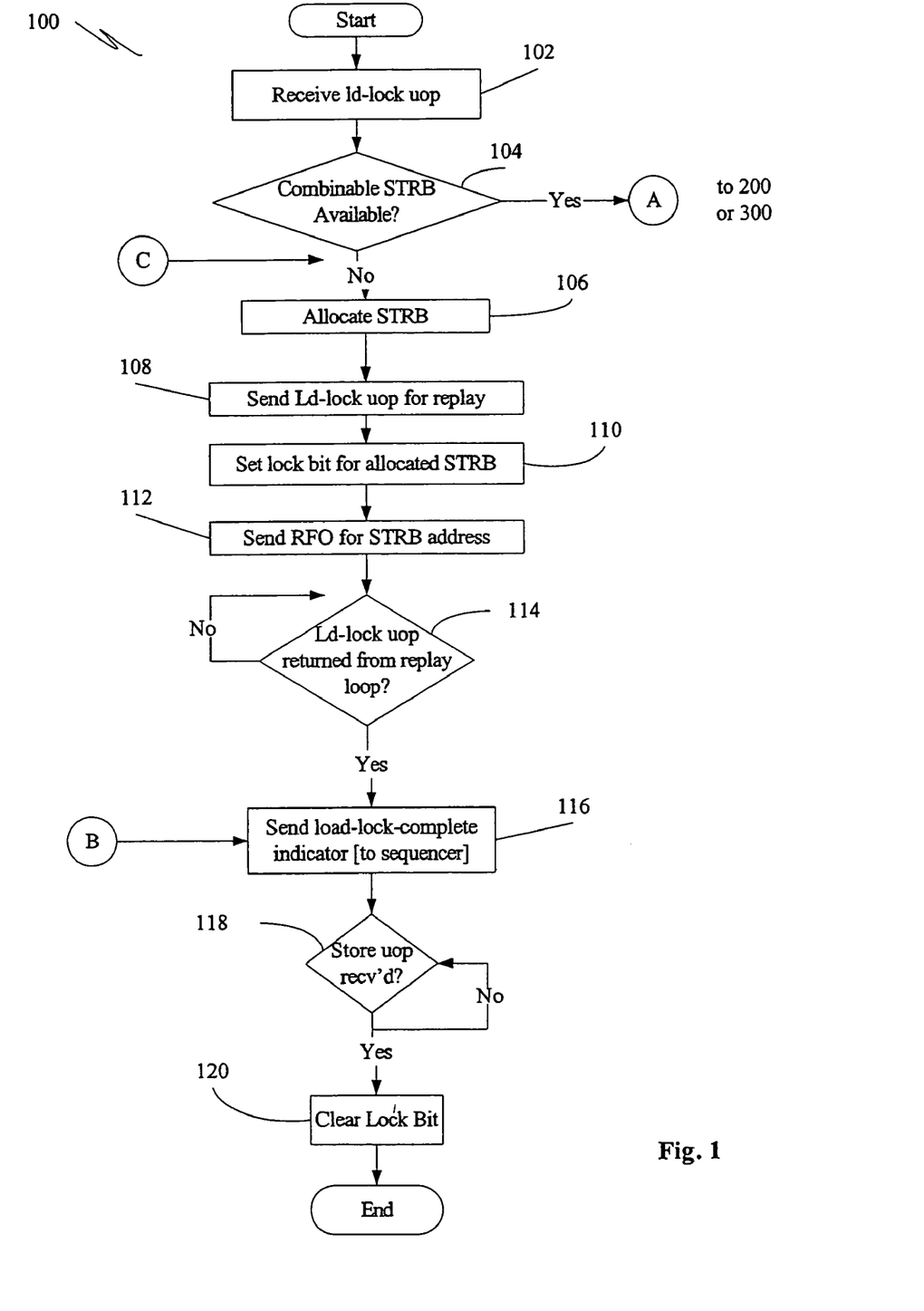
FIG. 1 is flowchart illustrating a general mechanism for performing a cache lock when no combinable store buffer ("STRB") is available.
Figure 2:
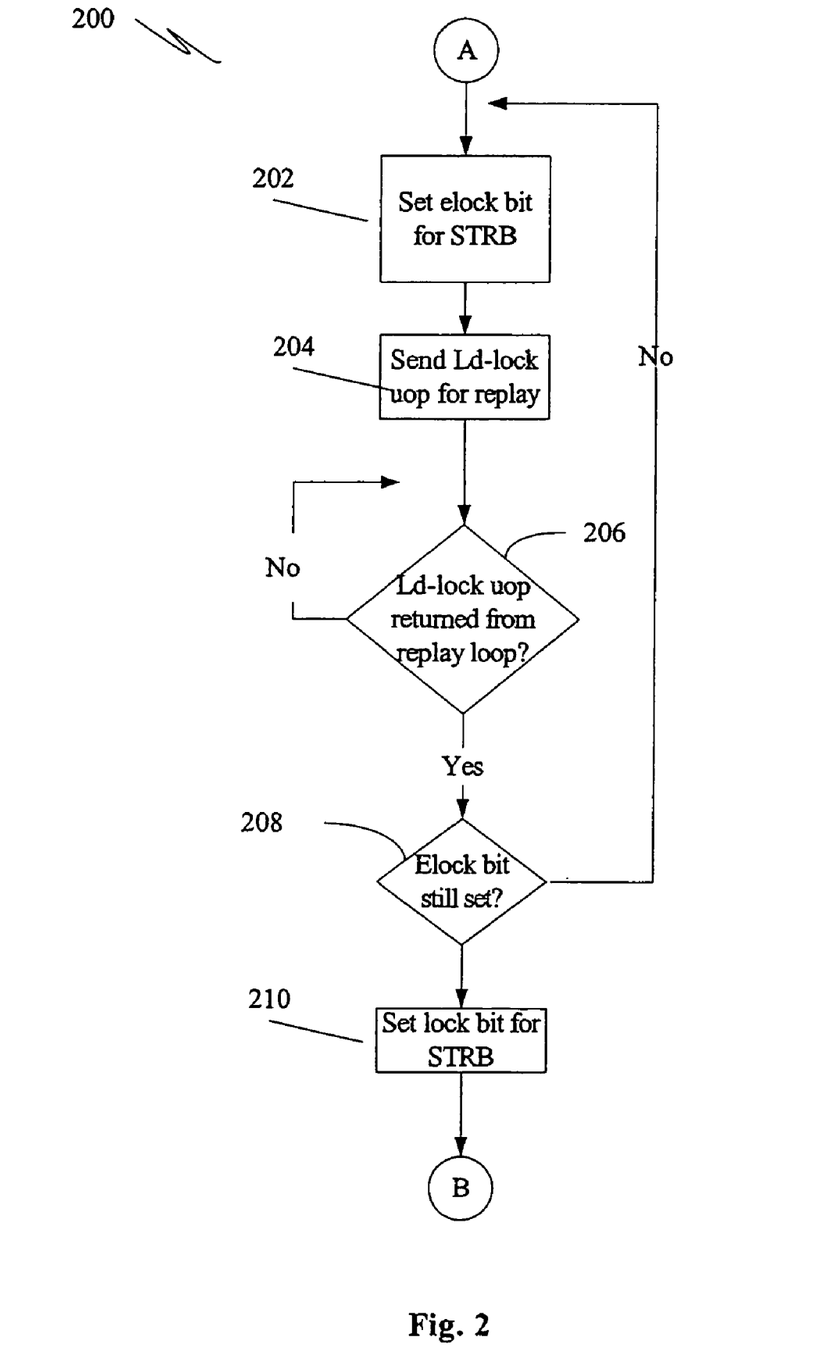
FIG. 2 is a flowchart illustrating an embodiment, according to the present invention, of performing speculative allocation of STRB during a cache lock when a combinable STRB is available.
Figure 3:
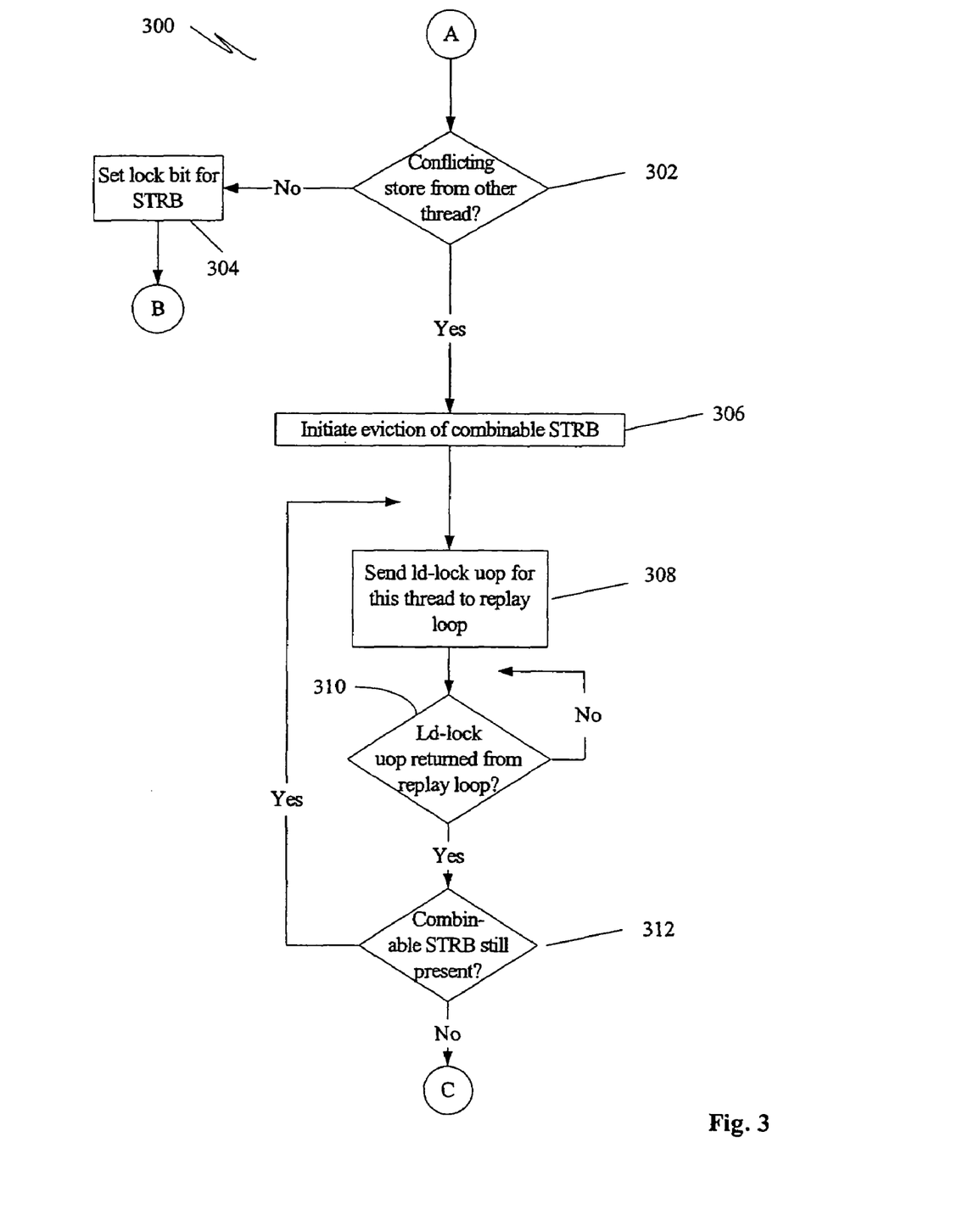
FIG. 3 is a flowchart illustrating a prior art scheme for evicting the contents of an STRB during a cache lock operation.

FIG. 1 is a flowchart illustrating a general mechanism for performing a cache lock when an existing store request buffer is not available for the address targeted by the cache lock operation. FIGS. 2 and 3 are flowcharts illustrating methods 200, 300 for performing a cache lock when a current combinable store request buffer ("STRB") for the requested lock address is present. FIG. 2 illustrates a method 200 according to at least one embodiment of the present invention, while FIG. 3 illustrates a method 300 that performs a less efficient STRB entry eviction approach.

Figure 4:
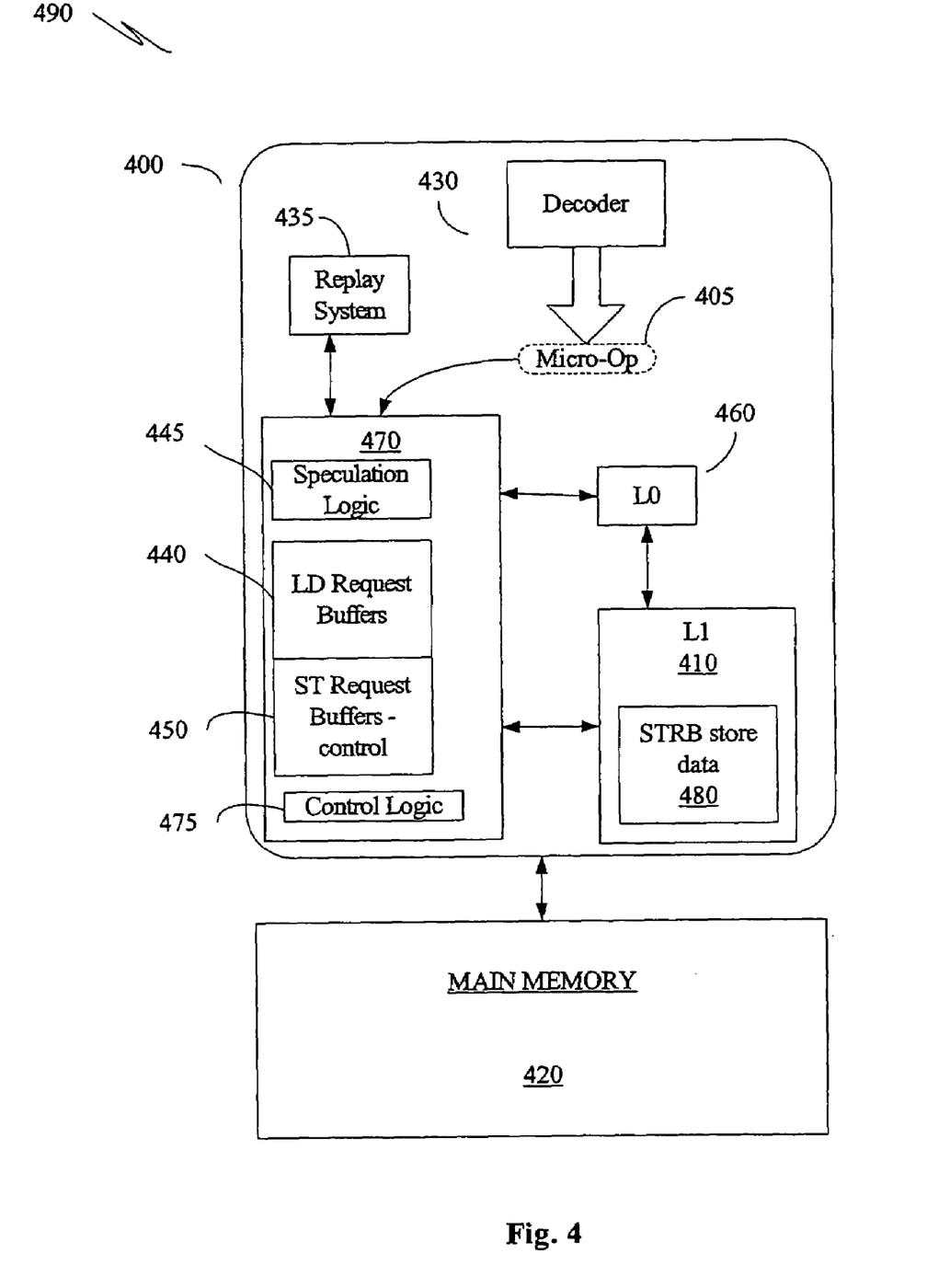
FIG. 4 is a block diagram of at least one embodiment of a processor capable of employing a speculative cache lock mechanism.

FIGS. 1, 2 and 3 will be discussed with reference to FIG. 4. FIG. 4 is a block diagram illustrating at least one embodiment of processor 400 capable of employing a speculative cache lock allocation method 200 as illustrated in FIG. 2. FIG. 4 illustrates a processor 400 that implements a non-blocking cache memory subsystem (the cache memory subsystem will sometimes be referred to herein by the shorthand terminology "cache system"). For at least one embodiment, the cache system is controlled by a memory execution cluster 470. The cache system includes an L0 cache 460 and an L1 cache 410. For at least one embodiment, the L0 cache 460 and L1 cache 410 are on-die caches. The processor 400 may also retrieve data from a main memory 420. The main memory 420, L1 cache 410, and L0 cache 460 together form a memory hierarchy. For at least one embodiment, certain replay processing (referred to herein as a "replay loop") is provided by a replay system 435.

Typically, when a store instruction is received, control logic 475 in the memory execution cluster ("MEC") 470 determines whether the address specified by the store µOP is indicated in the L0 cache 460. If so, the store data is retrieved from the L0 cache 460. If not, the MEC 470 determines whether the address specified by the store μOP is indicated in the L1 cache 410. If so, the data is retrieved from the L1 cache 410. If not, the MEC 470 continues to determine whether the address specified by the store micro-op is indicated in successive levels of the hierarchy until ultimately (if no hits are found), retrieving the store data from main memory 420.

FIG. 4 illustrates that, in a non blocking cache system that allows multiple outstanding loads and stores, load request buffers ("LDRB's") 440 and store requests buffers ("STRB's") 450 are used by the MEC 470 to keep track of memory access requests that have not yet completed. In such a system, the MEC 470 determines, when a store or load μOP is received, whether the address specified by the μOP is in the L0 cache 460. If so, it is determined whether the data associated with the address in the L0 cache 460 is stale. A stale data condition occurs when data in an LDRB or STRB has not yet been written to the L0 cache. If a load hits in both the L0 and in an LDRB or STRB, the data in the L0 is considered to be stale and no longer valid.

If there is a miss in the L0 cache 460, or if the data in the desired location of the L0 cache 460 is stale, then the control logic 475 of the MEC 470 determines whether the address specified by the μOP is present in the LDRB's 440 or the STRB's 450. One should note that, even for load instructions, the cache line containing the load address is brought into the processor 400 and placed in an entry of the LDRB's 450, this action is based on the assumption that, due to principles of spatial locality, a subsequent read or write to/from the cache line is likely to occur relatively soon. The STRB's 450 and LDRB's 440 are intended to represent any storage area capable of storing information regarding memory access requests that have not yet completed.

FIG. 1 illustrates a cache lock method 100 to process atomic operations on cached data in a weakly ordered memory model. For instance, read-modify-write memory operations are processed atomically. Once such an atomic operation is started, the processor 400 (FIG. 4) ensures that the operation will complete before another processor, bus agent, or thread is permitted to access the same memory location. In order to process such operations atomically, a lock/unlock mechanism is employed. The lock/unlock mechanism includes a load lock and store unlock μOP pair. A μOp to initiate, or trigger, a cache lock is referred to herein as a "load lock" μOp. The μOp that indicates that a cache lock operation is complete is referred to herein as a "store unlock" uop. To enforce atomicity, the processor 400 ensures that no other load or store μOp to the memory address associated with the cache lock operation will be executed between the load lock/store unlock μOp pair.

FIGS. 1 and 4 illustrate that, if a load-lock μOP is received 102, the MEC 470 determines 104 if there is a hit in the STRB's 450. Such determination is made because, for a read-write-modify operation, an entry of the store request buffers 450, also known as a write combining buffer (WCB), will be modified upon the "write" portion of the atomic operation. If no STRB 450 entry exists for the address specified by the load-lock μOP, one is allocated 106. If, on the other hand, an existing STRB 450 entry is located, it is further determined 104 whether the STRB entry is "combinable."

A "combinable" STRB entry 450 is an entry that was previously allocated by a ld-lock or store μOP and for which it is appropriate for the current read-modify-write operation to modify. Many factors may be considered to determine whether an entry of the STRB's 450 is "combinable." For example, an STRB 450 entry is not combinable unless it is in a GO (globally observed) state. That is, when the STRB 450 entry was previously allocated, a request for ownership (RFO) was issued. When the RFO has been received by all other processors in a multi-processor system, and when all the other processors have invalidated their copy of the cache line of interest, then the RFO has been globally observed and the STRB 450 entry is, accordingly, in the GO state.

Figure 5:
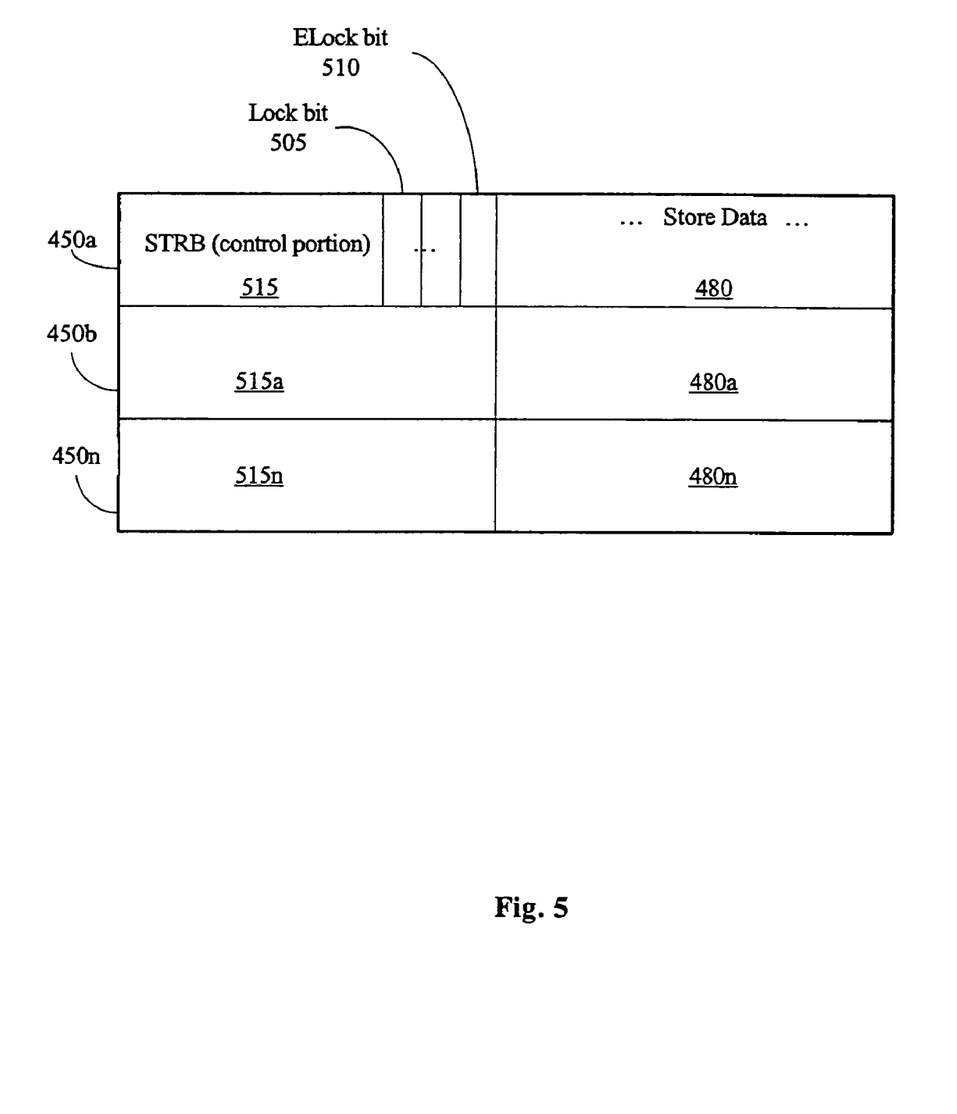
FIG. 5 is a block diagram illustrating an example entry of a store request buffer.

Brief reference to FIG. 5 provides illustration of example STRB entries 450a-450n. "Combinable" refers to the fact that modify the cache line contents held in a previously-allocated STRB entry 450a-450n before the contents of the STRB entry 450a-450n are stored back to memory. This approach is more efficient, say, than evicting the current contents of the STRB entry 450a-450n before performing the cache lock operation. In the latter case, the load-lock μOP would be replayed in a replay loop while the relatively long-latency eviction process takes place. During eviction, the current contents of the STRB entry 450a-450n would be written to memory. By determining that an already-allocated STRB entry 450a-450n is combinable, and then combining the cache lock operation with the current data in the existing, combinable STRB entry 450a-450n, the relatively long latency of an eviction may be avoided. Processing for the situation that a combinable STRB entry 450a-450n exists is discussed in further detail below in connection with FIGS. 2 and 3.

Returning to FIG. 1, viewed in conjunction with FIG. 5, it can be seen that the foregoing description indicates that the method 100 thus determines 104 whether combination of data from the present μOP with the existing data in the hit STRB entry 450a-450n is appropriate. If a combinable request buffer is not available for the address indicated in the load-lock μOp, then a new entry of the store request buffer 450 is allocated 106 for the address specified by the store or load μOP. The logic that triggers allocation 106 of the new request buffer also triggers a request to the next level of the memory hierarchy (and successive levels, if necessary) to return the data. Because the process of retrieving the appropriate cache line involves traversing the memory hierarchy, relatively long latency may be expected before the data is retrieved into the allocated STRB 540 entry. Accordingly, the load-lock μOP is sent 108 to a replay loop in order to allow other processing to occur during the latency interval.

During an atomic operation, no other memory operation may occur to the cache line associated with a load lock μOP. Accordingly, the STRB entry 450a for the load-lock μOp is "locked" 110 to indicate that a cache lock operation concerning the cache line indicated in the STRB entry 450a is in progress.

FIG. 5 will be consulted in conjunction with FIG. 1 to further discuss locking 110 a newly-allocated STRB entry 450a. A control portion 515 of each STRB entry 450a-450n includes a field, referred to as the lock bit 505, whose contents indicate whether the STRB entry 450a-450n is currently locked. For at least one embodiment, a logic-high value in a 1-bit lock bit field 505 indicates that the STRB entry 450 is locked.

The data portion 480a-480n of an STRB entry 450a contains the data to be stored to memory 420 (FIG. 4) upon eviction of the STRB entry 450a. Although logically associated with each other as illustrated in FIG. 5, one skilled in the art will recognize that the control portion 515 and the data portion 480 of an STRB entry 450a-450n need not necessarily physically reside in contiguous storage areas of a storage device, nor even reside in the same storage device. For instance, FIG. 4 illustrates that the control portion of the STRB's 450 may be included in the MEC 470 while the data portion may reside in the L1 cache 410.

Returning to the discussion of the control portion 515 of an STRB entry 450a-450n, the lock bit 505 for the newly allocated 106 STRB entry 450a is set 110 by speculation logic 445 of the MEC 470 to indicate that an atomic read-modify-write operation is in process to the cache line indicated by the STRB address, which is contained within the control portion 515 of the STRB entry 450a. Accordingly, FIG. 1 illustrates that failure to identify 104 a combinable entry 450a in the STRB's 450 triggers allocation 106 of a store request buffer entry 450a and the setting 10 of the lock bit 505 for the newly-allocated STRB entry 450a.

In addition to setting the lock bit 505 for the newly-allocated STRB entry 450a, it is desired that the cache line containing the address associated with the load-lock μOP be retrieved into the newly-allocated STRB entry 450a. To initiate bringing the data associated with the load lock request into the cache subsystem, a request for ownership ("RFO") is issued 112 for the address associated with the load lock μOP. An RFO issues to the memory hierarchy as well as to any other processors in a processing system 490 (FIG. 4) that includes processor 400 (FIG. 4). The result of issuing 112 the RFO is that the cache line containing the desired address for the load-lock μOP is retrieved from memory (assuming an embodiment wherein STRB entries 450a-450n are of cache-line granularity).

During the time that the desired cache line is being fetched from memory, the load-lock μOP makes its way through the replay loop. At block 114, it is determined whether the load-lock μOP has returned from the replay loop. If not, a wait loop is effected so that the check 114 is repeated until true. If the replay-complete check 114 evaluates to true, a load-lock complete indicator is issued by the MEC 470 (FIG. 4). Thereafter, a store received check 118 is iteratively performed until a store-unlock μOP is received to indicate that the cache lock operation is complete. During the time it takes to iteratively perform the check 118 until the check 118 evaluates to "true", the instructions of the atomic operation are performed. If it is determined during the store received check 118 that the store-unlock μOP has been received, it is assumed that the instructions of the atomic operation have completed execution. Accordingly, the lock bit 505 (FIG. 5) for the STRB entry 450a, which was allocated at block 106, is cleared 120 to indicate that the cache lock operation is complete.

FIGS. 2 and 3 illustrate processing 200, 300 to allocate an STRB entry 450 (FIG. 4) when it is determined 104 (FIG. 1) that a combinable STRB entry 450a-450n (FIG. 5) is available for the address specified in the load-lock μOp. The eviction method 300 of FIG. 3 will be discussed first to provide background against which an embodiment 200 of the present invention will be later discussed in connection with FIG. 2.

The method 300 of FIG. 3 (as well as the method 200 of FIG. 2, discussed below) is designed to detect and address the situation that multiple cache lock operations have been requested such that a subsequent cache request is desired before a prior cache lock operation is complete. Such situation may arise, for example, in systems that support a hardware technique known as simultaneous multi-threading ("SMT"). In SMT, multiple threads can execute simultaneously on a single processor without switching. In this approach, a single physical processor 400 (FIG. 4) is made to appear as multiple logical processors to operating systems and user programs. That is, each logical processor maintains a complete set of the architecture state. Depending on the embodiment, other resources of the physical processor 400 (FIG. 4), such as caches, execution units, branch predictors, control logic and buses may be shared.

FIG. 3 illustrates that one approach to handling contention for an existing combinable STRB entry 450a-450n by multiple threads when a cache lock is desired by one of the threads is to allow the first cache lock to complete and evict the contents of the STRB entry 450a-450n, before initiating the second cache lock. For purposes of discussion, it will be assumed that an STRB entry 450a (FIG. 5) has been identified 104 (FIG. 1) as a combinable STRB. FIG. 3 illustrates that the processing 300 begins at A. A is reached when it is determined 104 (FIG. 1) that a combinable STRB entry 450a exists for the address associated with the load-lock μOP that was received at block 102 (FIG. 1).

It is then determined 302 whether a conflicting store operation from another thread needs to complete during a certain time period. The time period is referred to herein as a "conflict window." For one embodiment, the conflict window begins with the presentation of the load lock uop to the start of the load pipeline. The conflict window is a period of time it takes to determine whether a previous store operation may need to write to the STRB entry 450a or whether an older snoop operation may need to snoop the contents of the STRB 450a, before the contents of the STRB 450a entry may be modified by the current read-modify-write operation indicated by the load-lock μOP received at block 102 (FIG. 1). If either of these conditions occur, a conflict exists and the load-lock μOP may not be processed yet. That is, if the load-lock μOP processing were allowed to proceed while one of these conflict conditions occurs, atomicity of the cache lock operation would be broken. Accordingly, during the conflict check 302, the address of the load-lock μOP is compared with the STRB entries 450a-450n.

If no conflict is detected during the conflict check 302, the lock bit 505 (FIG. 5) for the STRB entry 450a is set at block 304 in order to indicate that a lock is in progress for the cache line associated with the STRB entry 450a. (The lock bit for the STRB entry 450a may not be currently in a "true" state, even though the STRB entry 450a has already been allocated, if the previous allocation occurred due to a store instruction rather than a load-lock μOP). Processing then continues at B of FIG. 1.

If a conflict is detected during the conflict check 302, eviction of the contents of the STRB entry 450a is initiated 306. The load-lock μOP is sent 308 to the replay loop in order to allow time for the contents of the STRB entry 450a to be evicted to memory before processing of the current cache lock operation begins. A check 310 to determine whether the load-lock μOP has returned from the replay loop is iteratively performed until the check 310 evaluates to true. When the load-lock μOP returns from the replay loop it is determined 312 whether the replay has provided enough time for the eviction process to be completed. That is, it is determined 312 whether the STRB entry 450a contents have been evicted, or whether they are still present. If the contents are still present, it is assumed that they have not yet been evicted to memory, and more time is therefore needed to allow the eviction process to complete. In such case, the load-lock μOP is again sent 308 to the replay loop in order to allow additional time for the eviction process to run to completion. Such processing 308, 310, 312 is iteratively performed until the STRB-still-present determination 312 evaluates to false. When the determination 312 evaluates to false, it is assumed that the contents of the STRB entry 450a have been evicted to memory, and processing continues at C of FIG. 1. That is, an STRB entry 450a is allocated 106 for the load-lock μOP and the appropriate cache line is transferred 112, 114 from the memory hierarchy to the newly allocated STRB entry 450a.

From the foregoing discussion of FIG. 3, it can be seen that, when there is a conflict between a load-lock μOP in one thread and an older store or snoop operation to the same address from a different thread, the contents of the existing STRB entry 450a are evicted 306, 308, 310, 312. Such eviction may involve very long latencies, and the length of the latencies are variable. Furthermore, the lock state is not entered (i.e., lock bit is not set 302) until the rather time-consuming conflict resolution check 304 has been successfully completed.

FIG. 2 illustrates a more efficient method 200 of handling contention for an existing combinable STRB entry 450a-450n when a cache lock is desired. Generally, the FIG. 2 method 200 eliminates the eviction process 306, 308, 310, 312 (FIG. 3). FIG. 2 will be discussed in conjunction with FIG. 5.

As with FIG. 3, FIG. 2 illustrates that the processing 200 beings at A. A is reached when it is determined 104 (FIG. 1) that a combinable STRB entry 450a exists for the address associated with the load-lock μOP that was received at block 102 (FIG. 1). FIG. 2 illustrates that a thread-specific extended lock ("Elock") indicator 510 is speculatively set by speculation logic 445 (FIG. 4) without requiring that an entire conflict resolution process first be successfully completed. Rather than setting a lock bit 505 after the conflict resolution process has successfully completed, the FIG. 2 method 200 speculatively sets 202 an (Elock) bit 510, the Elock bit being an indicator of whether or not the STRB entry 450 associated with the Elock bit 510 is in a candidate state. The speculative setting 202 of the Elock bit 510 permits the cache lock conflict detection process to begin earlier, and proceed independent of, the pipeline clock rate of the processor 400 (FIG. 4). In order to allow enough time for the conflict resolution processing to complete, the load-lock μOP is sent 204 to the replay loop for replay. Accordingly, the latency associated with the replay loop, which is usually a predetermined latency of fixed length and is shorter than the average latency usually associated with an STRB eviction, is incurred for every cache lock request, even those for which no conflict may ultimately be detected.

As used herein in connection with the concept of modifying the Elock bit 510, the term "set" is meant to signify any manner of modifying data, and is not meant to be limited to, though it certainly does include, modifying a one-bit value to a logic-high state. Any manner of indicating that the STRB entry 450 is in a lock candidate state may be encompassed by the concept of "setting" the Elock bit 510, and need not necessarily be limited to a bit or bits that physically reside in the STRB entry 450 itself. The information indicated by the Elock bit 510 may be maintained in any type of data storage structure, including a register, table, or indicator logically and/or physically separate from the STRB entry 450.

A check 206 is iteratively performed until the load-lock μOP returns from the replay loop. During the time that the load lock μOP is in the replay loop, traditional conflict processing continues to be performed (see 750, FIG. 7) by speculation logic 445 (FIG. 4). If a conflict concerning the STRB 450a is detected during such processing, the Elock bit 510 for the STRB entry 450a is reset (see 750, FIG. 7).

At block 208, it is determined whether the Elock bit 510 remains set. If so, it is assumed that no conflict was detected during the window of time 750 that the load-lock μOP was in the replay loop. Accordingly, the current load-lock μOP may proceed to modify the STRB 450a, and the lock bit 505 for the STRB 450a is accordingly set 210. Processing then continues at B in FIG. 1.

From the preceding discussion one can see that the setting 202 of the Elock bit 510 for an STRB entry 450a provides the ability to track the state of an STRB entry 450a with more than just a binary "locked/unlocked" scheme. The Elock bit 510 provides additional granularity by indicating that the status of the STRB entry 450a as a "candidate for a lock." While the Elock bit 510 is set, the STRB entry 450a associated with the Elock bit 510 is deemed to be in a "candidate" state—an attempt is being made to lock the STRB entry 450a, but all conflicts may not yet have been resolved.

Figure 6:
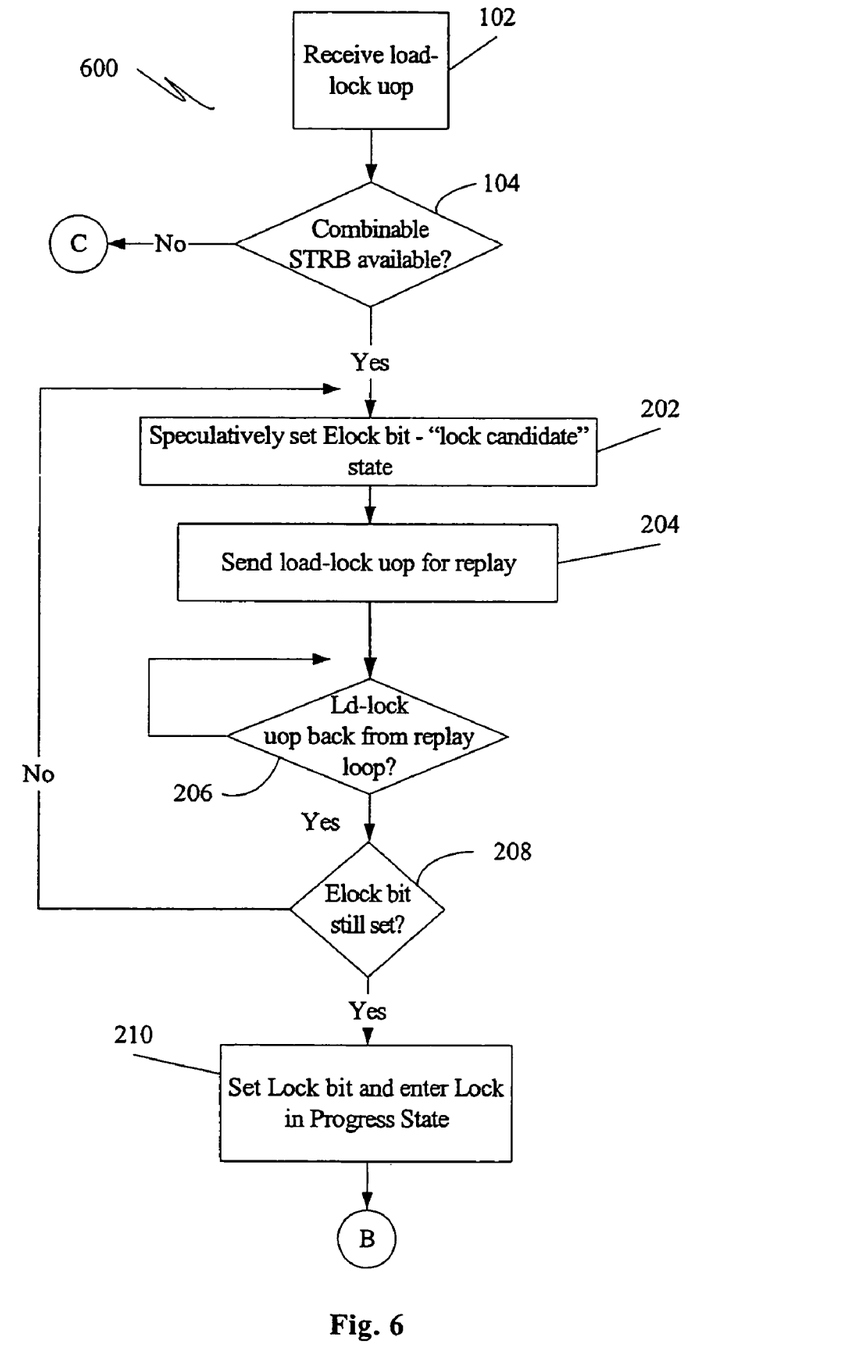
FIG. 6 is a flowchart illustrating a generalized method for performing, according to at least one embodiment, a cache lock using speculative allocation when a combinable STRB is available.

FIG. 6, discussed herein with reference to FIG. 5, illustrates that the detailed method illustrated in FIGS. 1 and 2 can be combined and simplified into a generalized method 600 for speculatively setting the Elock bit 510 for an existing STRB entry 450a. FIG. 6 illustrates that the method includes receiving 102 a load-lock μOP. The method 600 further includes determining 104 whether a combinable STRB entry 450a is currently allocated for the cache line containing the address indicated by the load-lock μOP. If a combinable STRB entry 450a for the requested memory address is detected, then processing continues at block 202. If not, processing continues at C of FIG. 1, where a fresh STRB entry 450a is allocated 106 for the load-lock μOP and processing continues, 108 through 120, as illustrated in FIG. 1.

If a combinable STRB entry 450a is detected 104, then the Elock bit 510 is speculatively set to a "true" value. Conflict detection checks such as checking for prior store or snoops to the STRB entry are postponed to be performed during the replay loop. One embodiment, for example, postpones the check for conflicting store instructions from other threads, performing such conflict check during the replay loop.

Accordingly, the time (measured, for instance in terms of pipeline stage or machine cycles) required to determine if a combinable STRB entry 450a is available 104 is abbreviated in comparison to the conflict determination window between blocks 302 and 304 of the FIG. 3 method 300. An assumption is thereby implemented in the method 600 of FIG. 6: it is assumed that conflicts are statistically rare and that it is therefore unduly limiting to force all load-lock μOP's to wait for the full conflict resolution process to complete before permitting the existing STRB entry 450a to be allocated in response to receipt 102 of the load-lock μOP. Instead, the STRB entry 450a is speculatively allocated 202 (via setting of the Elock bit 510) for the atomic operation associated with the load-lock μOP if a combinable STRB entry 450a is available. As such, the STRB entry 450a enters a "lock candidate" state. As is discussed below, the existing STRB entry 450a will be de-allocated (i.e., the Elock bit 510 will be reset to a "false" value) for the current atomic operation if a conflict is subsequently detected.

FIG. 6 illustrates that, at block 204, the load-lock μOP is sent to the replay loop. Accordingly, as mentioned above, each load-lock μOP will incur a replay delay, regardless of whether a conflict is detected.

After the replay of the load-lock μOP is complete, the method 600 checks 208 to determine if the Elock bit 510 is still set. The Elock bit 510 will have been reset, as is discussed further below, if a conflict was detected during the time that it took for the load-lock μOP to proceed through the replay loop. If the Elock bit 510 has been reset, then the method 600 will again to attempt to allocate the existing STRB entry 450a for the current load-lock μOP by repeating blocks 202, 204 and 208.

If, on the other hand, the Elock bit 510 is still set after replay of the load-lock μOP, then it is deemed that the STRB is appropriate for a cache lock and is not longer merely a "candidate" for a lock. Such processing is based on the assumption that any conflict between an older memory operation and the current load lock operation, which was not yet apparent at the time the Elock bit was speculatively set 202, will have become apparent and will have been detected at least by the time the load-lock μOP has completed the replay loop. Accordingly, the lock bit 505 is set 210 for the existing STRB 450a, which was identified at block 104.

Figure 7:
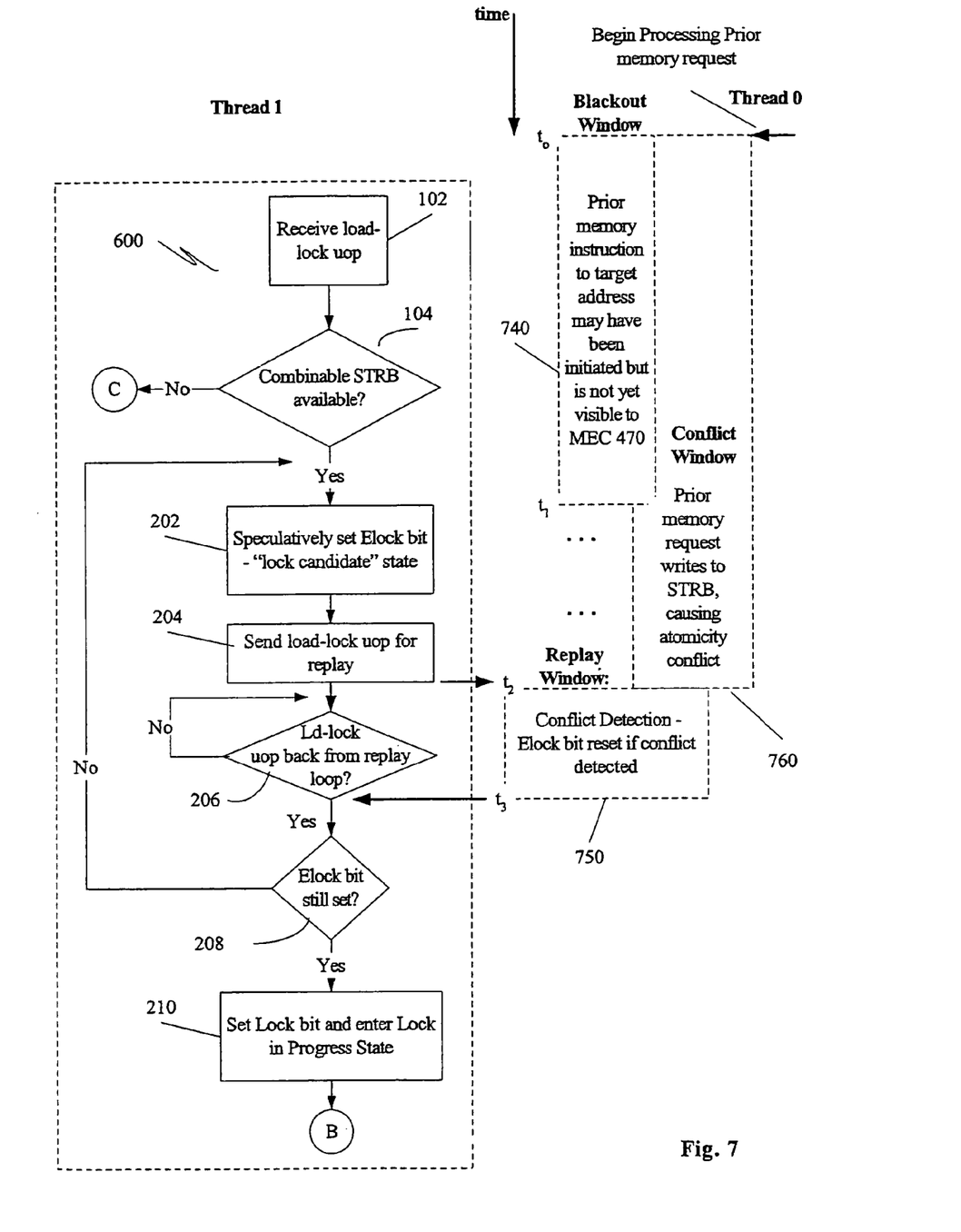
FIG. 7 is a data flow diagram illustrating a method of performing speculative allocation during a cache lock in order to preserve atomicity of a cache lock operation between two simultaneous threads.

FIG. 7 is a data flow diagram illustrating the method 600 of FIG. 6 in connection with a sample multi-threaded operation. FIG. 7 illustrates the interaction of data and events between a first thread, Thread 0, and a second thread, Thread 1. FIG. 7 is discussed herein in connection with FIG. 5. For purposes of example, it is assumed that Threads 0 and 1 each seek to perform a memory operation concerning an address common to a single cache line.

FIG. 7 illustrates that, at time $t_0$, Thread 0 begins processing a memory request. Thread 1 receives 102 a load-lock μOP concerning an address within the same cache line as the address relating to the Thread 0 memory operation. Assuming, as is illustrated in FIG. 7, t0 occurs before the time that Thread 1 receives 102 the load-lock μOP, a blackout window 740 may occur. A blackout window 740 is the period of time during which Thread 1 is unable to detect a memory operation that has been initiated within another thread (in this case, the other thread being Thread 0). The blackout window 740 is a relatively short time frame after which a memory operation from a previous thread is visible to Thread 1. However, during a relatively small blackout period 740, such operation is not yet visible to other threads. Memory operations that begin on another thread, such as Thread 0 illustrated in FIG. 7, and that are not yet visible to a current thread, such as Thread 1, pose the potential for a breach of atomicity for an atomic operation on the current thread (Thread 1).

FIG. 7 illustrates that the blackout window 740 is defined, for at least one embodiment, as the period of time between the initiation of a potentially conflicting memory operation in a first thread (such as Thread 0) and the time ($t_1$) when a second thread (Thread 1) must determine whether to allocate an existing STRB entry 450a for its atomic memory operation. For the method 600 illustrated in FIG. 6, time $t_1$ occurs when the Elock bit is set 202. At such time (t1), there may be a conflict in process, but the current thread (Thread 1) cannot yet see it. In other words, the conflict is "blacked out" from Thread 1.

At some point in time after the Elock bit 510 is speculatively set 202 at time $t_1$ in Thread 1, the conflict will be realized when Thread 0 writes to the STRB entry 450a. The time frame during which the conflict can thus be realized is referred to herein as the conflict window 760. FIG. 7 illustrates that the conflict window 760 begins at time $t_1$ and ends at time $t_2$. That is, the timing illustrated in FIG. 7 is based on the assumption that the conflict will be realized at or before the time that an instruction is scheduled for replay.

The replay window 750 begins at time $t_2$ when the load-lock μOP is sent 204 to the replay loop. During the replay window 750, it is determined whether a conflict has occurred between a prior-started memory operation in another thread (i.e., Thread 0) and the current cache lock operation in a thread of interest (i.e., Thread 1). It is assumed that the conflict will occur by the time ($t_2$) that the replay is signaled. If a conflict is detected during the replay window 750, the Elock bit 510 is reset to a "false" value. If, on the other hand, no conflict is detected during the replay window 750, then the Elock bit 510 remains in the "set" state at the Elock check 208. In either case, processing continues as discussed above in connection with FIG. 6.

In sum, a method for speculatively allocating an existing store request buffer for a cache lock operation in a multi-threaded environment has been described. An embodiment of the method is performed by a memory execution cluster 470, which may perform the method for each thread in a multi-threaded environment. The memory execution cluster 470 may send and receive μOP's to and from a replay system 435. The memory execution cluster 470 includes speculation logic 445 capable of performing at least one embodiment of the speculative allocation described herein. For at least one embodiment, the memory execution cluster 470 and replay system 435 are included within a processing system that is capable of multi-threaded processing.

An example of one such type of processing system is shown in FIG. 4. Sample system 490 may be used, for example, to execute the processing for a method of speculatively allocating an existing store request buffer for a cache lock operation, such as the embodiments described herein. Sample system 490 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, set-top boxes, personal digital assistants and other hand-held devices, and the like) may also be used. In one embodiment, sample system 490 may be executing a version of the Windows™ operating system available from Microsoft Corporation, although other operating systems and graphical user interfaces, for example, may also be used.

In the preceding description, various aspects of speculatively allocating a store request buffer during a cache lock operation have been described. For purposes of explanation, specific numbers, examples, systems and configurations were set forth in order to provide a more thorough understanding. However, it is apparent to one skilled in the art that the described method may be practiced without the specific details. In other instances, well-known features were omitted or simplified in order not to obscure the method.

While particular embodiments of speculative allocation of an existing store request buffer during a cache lock operation have been shown and described, it will thus be obvious to those skilled in the art that changes and modifications can be made without departing from the present invention in its broader aspects. The appended claims are to encompass within their scope all such changes and modifications that fall within the true scope of the present invention.

What is claimed is:

1. A system comprising:
   a main memory;
   a store request buffer to store information regarding a memory access request that has not yet accessed the main memory;
   a replay system; and
   speculation logic to speculatively place the store request buffer into a lock candidate state responsive to receiving a micro-instruction;
   wherein the speculation logic is further to send the micro-instruction to the replay system; and wherein the speculation logic is further to place the store request buffer from the lock candidate state to a lock state responsive to determining that the store request buffer remains in the lock candidate state after the micro-instruction has returned from the replay system.

2. The system of claim 1, wherein:

the speculation logic is to set an indicator of the store request buffer in order to place the store request buffer into a lock candidate state responsive to receiving the micro-instruction.

3. The system of claim 1, wherein:

the speculation logic is further to determine whether a conflict concerning the store request buffer is detected.

4. The system of claim 3, wherein:

the speculation logic is further to determine whether a conflict concerning the store request buffer is detected by determining whether an Elock indicator is set.

5. The system of claim 1, wherein:

the speculation logic is further to remove the store request buffer from the lock candidate state responsive to detecting a conflict.

6. The system of claim 1, wherein:

the speculation logic is further to place the store request buffer from the lock candidate state to a lock state by setting an Elock indicator associated with the buffer.

7. The system of claim 1, wherein:

the speculation logic is further to determine whether the micro-instruction has returned from the replay system.

\* \* \* \* \*